(12) United States Patent
Montagnani et al.

(10) Patent No.: US 11,174,595 B2
(45) Date of Patent: Nov. 16, 2021

(54) TISSUE PAPER CONVERTING LINE AND METHOD

(71) Applicant: Fabio Perini S.p.A., Lucca (IT)

(72) Inventors: Franco Montagnani, Palaia (IT); Alessandro Morelli, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 337 days.

(21) Appl. No.: 16/316,389

(22) PCT Filed: Jul. 5, 2017

(86) PCT No.: PCT/EP2017/066755
§ 371 (c)(1),
(2) Date: Jan. 9, 2019

(87) PCT Pub. No.: WO2018/011033
PCT Pub. Date: Jan. 18, 2018

(65) Prior Publication Data
US 2019/0301099 A1 Oct. 3, 2019

(30) Foreign Application Priority Data
Jul. 12, 2016 (IT) ........................ 102016000072709

(51) Int. Cl.
*D21G 9/00* (2006.01)
*B65H 18/14* (2006.01)
*D21F 11/00* (2006.01)
*G01B 11/06* (2006.01)
*B65H 23/188* (2006.01)

(52) U.S. Cl.
CPC .......... *D21G 9/0045* (2013.01); *B65H 18/145* (2013.01); *B65H 23/188* (2013.01); *D21F 11/006* (2013.01); *G01B 11/0691* (2013.01); *B65H 2511/13* (2013.01); *B65H 2701/1924* (2013.01)

(58) Field of Classification Search
USPC ........................................................ 162/198
See application file for complete search history.

(56) References Cited

U.S. PATENT DOCUMENTS 4,937,445 A * 6/1990 Leong .................... G01B 11/00
250/237 G
6,036,137 A 3/2000 Myren

FOREIGN PATENT DOCUMENTS

EP 1849914 A1 10/2007
WO 2016108843 A1 7/2016

* cited by examiner

*Primary Examiner* — Mark Halpern
(74) *Attorney, Agent, or Firm* — Breiner & Breiner, L.L.C.

(57) ABSTRACT

A converting line for processing tissue paper includes an unwinder for unwinding reels of tissue paper; a rewinding machine for forming rolls of tissue paper; a feeding path between the unwinder and the rewinding machine, for at least one ply of tissue paper; along the feeding path, a first detection unit to detect the thickness of the tissue paper fed along the feeding path in a feeding direction; a control system, interfacing with the detection unit, and configured to act on at least one production parameter of the converting line based on the detected tissue paper thickness.

14 Claims, 5 Drawing Sheets

TISSUE PAPER CONVERTING LINE AND METHOD

This application is a 371 of PCT/EP2017/066755 filed 05 Jul. 2017.

TECHNICAL FIELD

The invention relates to tissue paper converting lines. In particular, embodiments described herein relate to manufacturing lines for tissue paper rolls, such as toilet paper, kitchen towels or the like.

BACKGROUND ART

In the field of tissue paper converting for manufacturing toilet paper, kitchen towels, paper napkins, handkerchiefs and similar products, reels of large dimensions, so-called parent reels, are usually produced by means of continuous machines. The parent reels have very large diameters and axial dimensions in the order of some meters. Each parent reel contains one or more wound plies of tissue paper.

Through so-called converting lines, the parent reels are transformed into articles to be packaged and sold. The converting lines may have different configurations, according to the article to be produced.

The converting lines for manufacturing tissue paper rolls typically have at least one unwinder, where the parent reels are unwound to supply the tissue paper ply to the downward stations. The converting lines also have a machine for rewinding one or more tissue paper plies fed from one or more reels to form rolls or logs, whose final diameter is equal to the diameter of the articles to be manufactured and whose axial dimension is equal to the axial dimension of the parent reels.

Other machines are provided downstream of the rewinding machine, for sealing the tail edge of the logs, for instance by gluing, as well as subsequent machines for cutting the logs into small rolls whose axial dimensions correspond to the article to be sold. The converting lines also comprise packaging machines, where the rolls are packaged, individually or grouped, in packages made of plastic film or other suitable material, to be sold.

The converting lines may also comprise other stations, according to the articles to be produced; they may comprise, for example, embossing units, embossing-laminating units, printing units, ply-bonding units and the like, usually arranged between the unwinder(s) and the rewinding machine.

The end quality of the finished articles, i.e. the articles downstream of the rewinding machine, strongly varies, also in terms of correspondence between the nominal and the actual dimensions, according to the production parameters and the features of the tissue paper plies fed from the parent reels. Moreover, the features of the ply wound on a reel may vary between the first and the last turns. For example, the ply thickness may be greater in the outer turns than in the inner ones, due to the fact that the ply is pressed in the wound reel.

There is therefore a continuous need for improving the converting lines in order to control and adjust the production parameters so that the finished articles have the desired features, i.e. especially to have finished rolls of a given diameter and containing a specific amount of wound tissue paper.

SUMMARY OF THE INVENTION

According to a first aspect, a tissue paper converting line is provided, comprising an unwinder for unwinding reels of tissue paper, a rewinding machine for forming rolls of tissue paper by winding lengths of tissue paper; and a feeding path between the unwinder and the rewinding machine, for at least one tissue paper ply. Typically, the line may also have several paths for several tissue paper plies from different parent reels, the plies being then joined to form a single web material constituted by more plies. Along the feeding path, at least one detection unit is advantageously provided for detecting the thickness of the tissue paper fed along the feeding path in a feeding direction. A control system is also provided, interfacing with the detection unit and configured to act on at least one production parameter of the converting line according to the detected tissue paper thickness.

By measuring the thickness it is possible to act on a production parameter to adjust deviations from the nominal thickness value.

As will be described below, in some embodiments the control system advantageously acts on one or more production parameters in order to adjust thickness deviations from a nominal value, in order to have finished rolls whose diameter is equal to a nominal diameter or comprised within a tolerance range around a nominal diameter.

As it will be better explained below, the production parameter may be directly correlated with thickness, i.e. it can be a production parameter whose change results, directly or indirectly, into a thickness change, i.e. into a thickness adjustment. Alternatively, or in combination, the control system may act on one or more production parameters, at least one of which does not act on thickness. For example, when a tissue paper thickness deviation is detected, the control system can modify one or more production parameters to balance this deviation, so that, without adjusting (or only partially adjusting) the thickness, the finished roll exiting the rewinding machine has a diameter comprised within a tolerance range around the nominal value.

Tissue paper thickness deviations may be balanced, for example, by changing the winding density. This is particularly useful, for example, in case the control system can no longer act on the paper thickness, for example because the production parameters affecting the thickness are already at the limit value (maximum or minimum) and cannot be changed any more.

In advantageous embodiments, an embossing unit may be advantageously provided between the unwinder and the rewinding machine; the embossing unit comprises at least an embossing roller and a pressure roller, defining an embossing nip therebetween, through which at least one tissue paper ply passes. As understood herein, a pressure roller may be a roller with a resiliently yielding smooth surface. The embossing roller is provided with protuberances penetrating the pressure roller so as permanently to deform the tissue paper passing through the embossing nip formed between the pressure roller and the embossing roller. In other embodiments, the pressure roller is rigid and has an engraved surface meshing with the embossing protuberances of the embossing roller.

In any case, the embossing unit is capable of modifying an embossing parameter, for example the pressure between embossing roller and pressure roller, or the center-to-center distance therebetween. By acting on the embossing parameter, the embossing depth, and therefore the tissue paper thickness at the exit of the embossing unit, is changed.

The converting line may comprise one or more embossing units or embossing-laminating units, with several pairs of embossing roller-pressure roller, for separately embossing one or more tissue paper plies that are then bonded together, for instance by gluing.

The production parameter on which to act may be chosen among the following: tissue paper tension; tissue paper speed; an embossing condition in an embossing unit of the converting line; length of tissue paper wound on a roll being formed in the rewinding machine; speed of one or more winding members of the rewinding machine; pressure exerted by one or more winding members of the rewinding machine on a roll being formed; paper tension.

Further features and embodiments of the converting line according to the present invention will be described hereunder and in the attached claims, which form an integral part of the present description.

According to a further aspect, a method is provided for producing tissue paper rolls in a converting line comprising at least an unwinder, a rewinding machine and a feeding path from the unwinder to the rewinding machine; wherein the method comprises the steps of:
- unwinding at least one tissue paper ply from a parent reel in the unwinder;
- feeding the tissue paper ply along the feeding path towards the rewinding machine;
- rewinding the tissue paper ply in rolls in the rewinding machine;
- measuring the tissue paper thickness along the feeding path;
- acting on at least one production parameter of the converting line based on the detected tissue paper thickness.

The method may comprise the step of modifying at least one production parameter based on the detected tissue paper thickness in order to keep the roll diameter within a tolerance range around a nominal value. For example, the method may comprise the steps of:
- setting a series of production parameters in order to achieve a nominal diameter of the finished rolls, these production parameters comprising the tissue paper thickness;
- measuring the tissue paper thickness;
- in case a thickness deviation from a nominal value is detected:
  - modifying a production parameter so as to bring the tissue paper thickness again to the nominal value;
  - and/or selecting a different series of production parameters to achieve the nominal diameter.

Further features and embodiments of the method are disclosed in the description below and in the attached claims.

BRIEF DESCRIPTION OF THE DRAWINGS

The invention will be better understood by following the description and accompanying drawing, which shows practical embodiments of the invention. More particularly, in the drawing.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
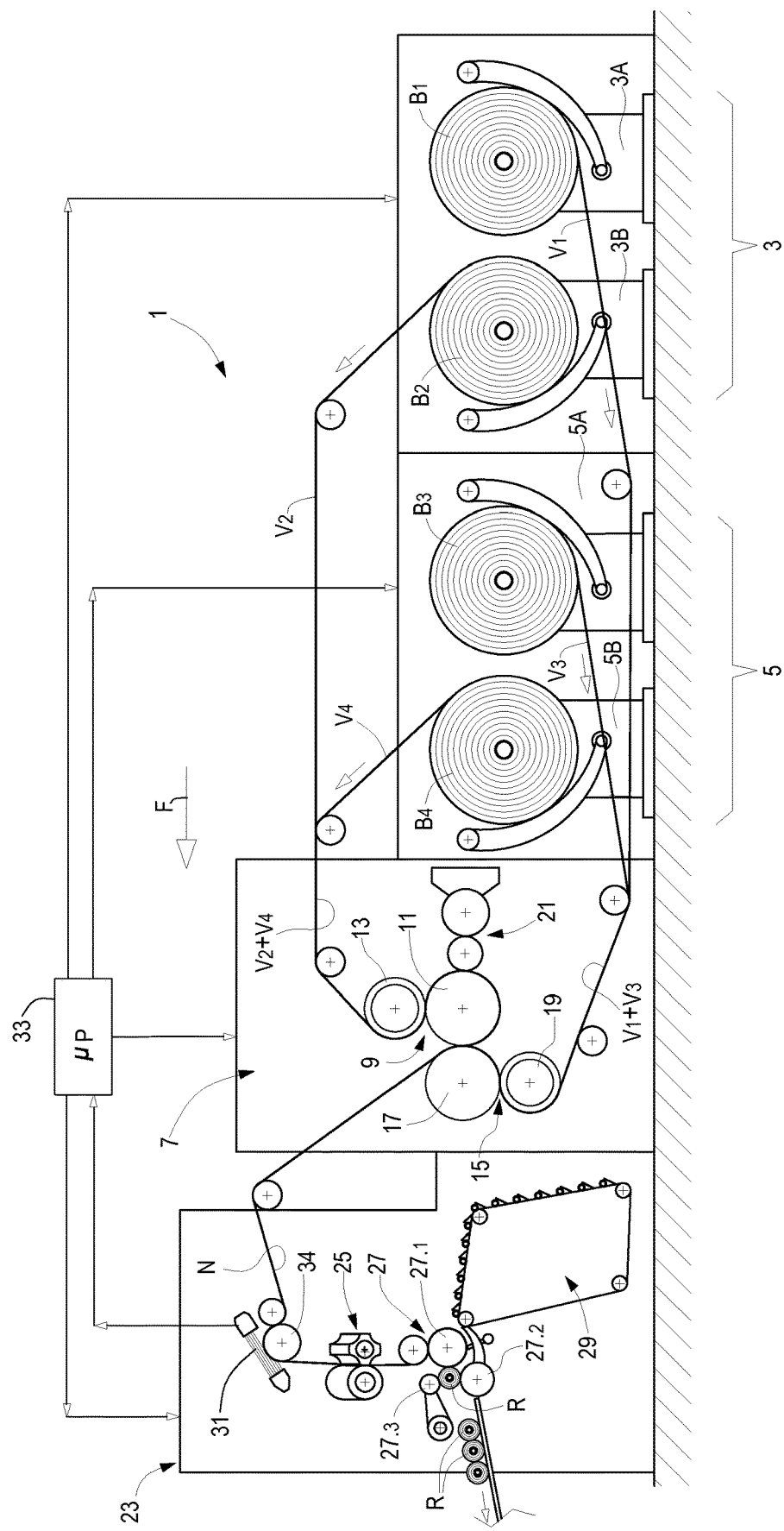
FIGS. 1, 2 and 3 schematically show side views of three embodiments of respective converting lines.

With initial reference to the embodiment of FIG. 1, the converting line, indicated as a whole with number 1, comprises two unwinders 3 and 5 arranged in series along a main direction F, along which the converting line 1 extends. In the illustrated embodiment, each unwinder 3, 5 has two unwinding units respectively indicated with 3A, 3B for the unwinder 3, and with 5A and 5B for the unwinder 5.

Parent reels B1, B2, B3 and B4 are positioned in one or both the unwinders 3, 5. In the arrangement of FIG. 1, four parent reels B1, B2, B3, B4 are indicated, that are simultaneously unwound to supply, according to the arrows indicated in the figure, four tissue paper plies V1, V2, V3 and V4 to the stations of the converting line 1 downstream of the unwinders. The number of parent reels and the number of plies supplied therefrom may be different from those indicated. For example, the unwinders may be more than two, and each of them may comprise one or two unwinding stations. Moreover, each parent reel may contain more than one tissue paper ply. The plies from a single reel or from different reels may be either joined together to follow the same path, or separated at least along part of the path along the converting line 1 so as to be subjected to different processing operations.

In the embodiment of FIG. 1, an embossing-laminating unit 7 is provided downstream of the unwinders 3, 5. In the embossing-laminating unit 7 the tissue paper plies from the unwinders 3, 5 are embossed and laminated together, for example using a glue.

In other embodiments, the embossing-laminating unit 7 is omitted. In further embodiments, more embossing-laminating units may be provided, or embossing units instead of embossing-laminating units can be provided. In addition to, or instead of, the embossing or embossing-laminating unit(s), printing units may be provided, as well as mechanical ply-bonding units or the like.

In the embodiment of FIG. 1, the plies V2 and V4 are jointly fed to a first embossing nip 9 of the embossing-laminating unit 7. The first embossing nip 9 is defined between a first embossing roller 11 and a first pressure roller 13. The first embossing roller 11 is provided with embossing protuberances co-acting with a resiliently yielding coating of the first pressure roller 13.

The plies V1 and V3 are fed to a second embossing nip 15 defined by a second embossing roller 17 and a second pressure roller 19. The second embossing roller 17 is provided with embossing protuberances 19 co-acting with a resiliently yielding coating of the second pressure roller 13.

Reference number 21 indicates a glue applicator. Embossing-laminating units of the type schematically shown in FIG. 1 are known per se and do not require further explanation. What is important for the present description is that in the embossing-laminating unit 7 one or more embossing rollers are provided, co-acting with respective pressure rollers to form respective embossing nips, through which one or more tissue paper plies pass in order to be embossed and bonded together by gluing and lamination. Embossing of the tissue paper plies increases the overall thickness of the plies. As it is known, the embossing depth may be modified while the embossing roller is working, for example by increasing the pressure between the embossing roller and the corresponding pressure roller. By modifying the embossing pressure it is possible to modify the deformation of the pressure roller coating as well as the penetration depth of the embossing protuberances of the embossing roller into the pressure roller. As a result, the height of the protuberances on the tissue paper ply, and therefore the thickness thereof is modified and, thus, the overall thickness of the multi-ply web material N obtained downstream of the embossing unit after bonding the embossed plies is also modified.

Downstream of the embossing-laminating unit 7 a rewinding machine 23 is provided. The rewinding machine 23 comprises a perforating unit 25 and a winding head 27. Both the perforating unit 25 and the winding head 27 are known per se, and can be realized in any manner known to those skilled in the art. Therefore, the structure of the rewinding machine 23 will not be detailed herein. The winding head 27 comprises a plurality of winding rollers 27.1, 27.2, 27.3. In the example schematically illustrated in the attached figures, three winding rollers are provided, but those skilled in the art know that also other configurations of rewinding machines exist, with a different number of winding rollers, for example with four winding rollers.

Moreover, as it is well known to those skilled in the art, the rewinding machines may be either peripheral, as those schematically illustrated herein, wherein the rolls R are formed in a winding cradle formed by winding rollers rotating in peripheral contact with the rolls, or central, wherein the rolls are formed around a mandrel or tailstocks axially engaging a tubular winding core and keeping it into rotation, to wind the web material N thereabout.

In general, for the purposes of the present description and the methods and systems described herein, the rewinding machine is preferably of the peripheral type, as schematically shown, but in other embodiments it can be a central rewinder.

Reference number 29 indicates a feeder which feeds tubular winding cores towards the winding head 27 of the rewinding machine 23. If the rewinding machine 23 is of the coreless type, i.e. for the production of tissue paper rolls without tubular winding core, the core feeder 29 may be omitted.

Letter R indicates the rolls or logs resulting from winding given amounts of tissue paper multi-ply web material N in the rewinding machine 23.

As it is known, the rolls R are produced sequentially, without interrupting the feeding of tissue paper plies V1-V4 along the converting line 1. Usually, the rewinding machine 23 is provided with means adapted to start winding of a roll, to sever the web material N once the roll with the desired amount of tissue paper has been wound, and to start winding of the next roll.

The perforating unit 25 divides the web material N formed by the tissue paper plies V1-V4 into single sheets that the end user can separate from one another along perforation lines.

The rolls R are then fed to a severing machine, not shown, to be subdivided into small rolls of dimensions suitable for packaging and sell. Other processing stations may be provided between the rewinding machine and the severing machine, for example accumulators and tail sealers for sealing the tail end of each roll or logs R.

The thickness of the web material N, formed by one or more plies V1-V4, is a critical parameter in the production of tissue paper rolls. For example, the web material thickness substantially affects the final diameter of the rolls or logs R produced by the rewinding machine 23. The rolls diameter may be a critical aspect during the packaging step.

Therefore, it can become necessary to control the tissue paper thickness at one or more points along the converting line 1, in order to check or modify one or more production parameters to keep the tissue paper thickness within acceptable ranges. In other cases it could be necessary, for instance, to modify the tissue paper thickness in order to produce batches of rolls with different features.

As will be better explained below, the tissue paper thickness may be measured after embossed and bonding the plies V1-V4 which form the multi-ply web material N fed to the rewinding machine 23. In other embodiments, it could be useful or necessary to measure the thickness of the single plies V1-V4, or of the semi-finished products formed by a number of plies greater than 1 but lower than the total number of plies forming the multi-ply web material N. Also, it could be useful or necessary to measure the thickness of the web material, intended as a single ply or a set of more plies, at different positions along the converting line 1, before or after embossing and/or bonding the tissue paper plies.

A method will be described below for controlling the tissue paper thickness, that can be generally applied to detect the thickness of a tissue paper ply (single or multiple) at any point along the converting line 1, according to production needs, to the structure of the converting line 1 or to other parameters. The examples detailed below are only some possible ways of measuring the thickness of one or more tissue paper plies at one or more points along the converting line 1; it shall however be understood that the concept described herein with reference to some possible embodiments can be modified, altered, widened or integrated, using a different number of variously arranged tissue paper thickness detection units according to needs, at different positions along the converting line 1, before, after or during embossing, or directly upstream of the rewinding area in the rewinding machine 23. Therefore, the embodiments described with specific reference to FIGS. 1, 2 and 3 shall be considered only examples illustrating some of the possible developments, applications and integrations of the general concept disclosed herein.

With specific reference to the embodiment of FIG. 1, upstream of the rewinding machine 23, more precisely upstream of the perforating unit 25, a first detection unit 31 is arranged, an embodiment of which will be described in greater detail with reference to FIGS. 4 and 5. The detection unit 31 is combined with a guide roller 34 for guiding the web material N, for the purposes that will be more apparent later on from the description of FIG. 4.

The detection unit 31 interfaces with a central control unit that is part of a control system 33. The control system 33 interfaces, for example, with the rewinding machine 23 and/or the embossing unit 27, as schematically shown in FIG. 1. The control system 33 may also interface with the unwinders 3 and 5. The usefulness of the connection between the control system 33 and the stations 3, 5, 7, 23 of the converting line 1, or the units/sub-units thereof, will be described below.

As those skilled in the art will understand from the following description, in some embodiments the control system 33 is comprised of a single programmable control unit, for example a microcomputer, a computer or the like. In other embodiments, the control system 33 comprises more logic controllers, like PLC, microprocessors, microcomputers or the like, arranged according to suitable hierarchies. The control system 33 may also comprise a central control unit connected to peripheral control units that are associated with the various stations of the converting line 1, for example with the unwinders 3, 5, with the embossing-laminating unit 7 and with the rewinding machine 23. The configuration of the control system 33, and the distribution of the components forming the structure thereof, may be of any type, according to the specific design chosen.

Figure 2:
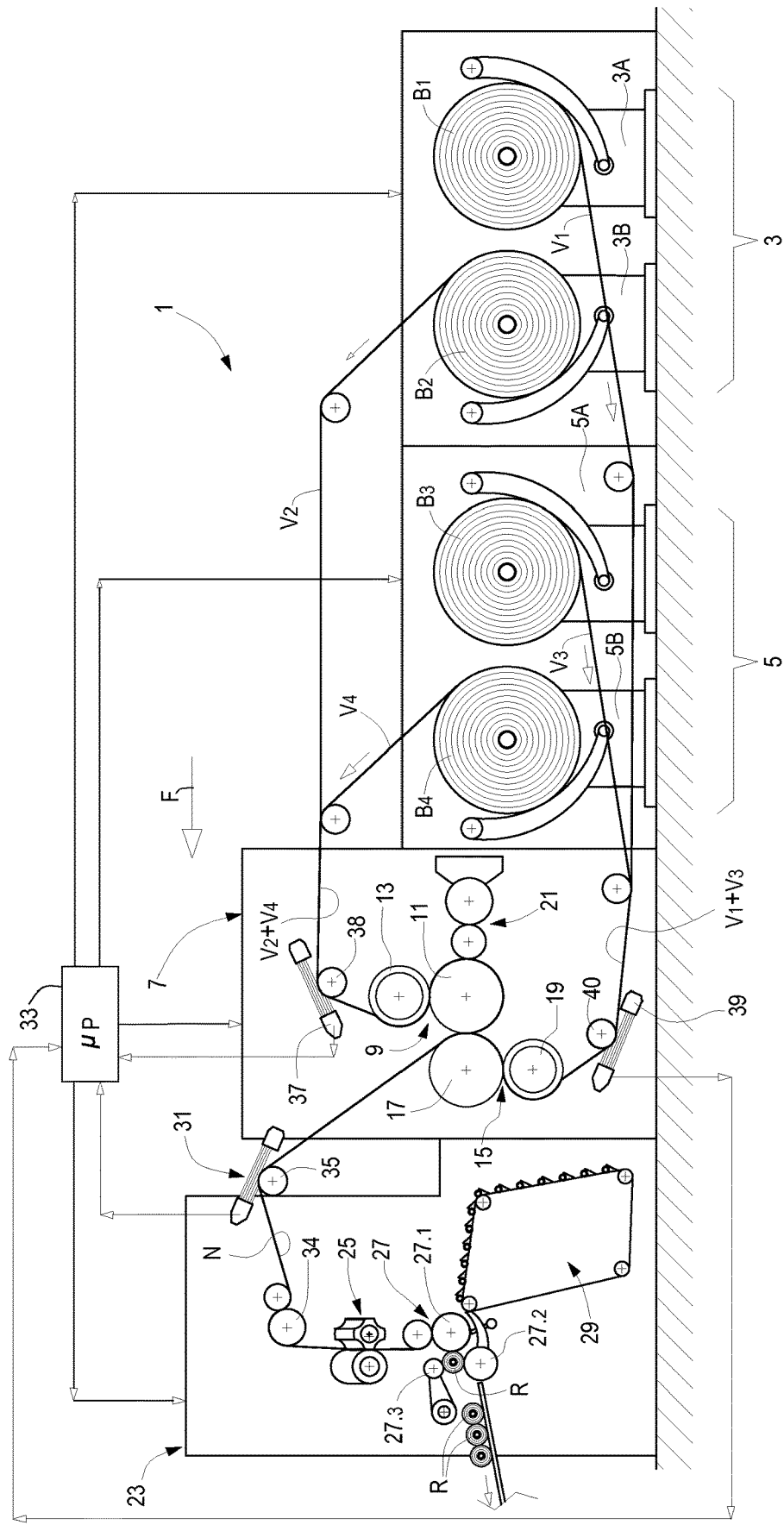

FIG. 2 illustrates a second embodiment of the converting line 1. The same references indicate equal or corresponding parts to those described with reference to FIG. 1. These parts will not be described again.

The embodiment of FIG. 2 differs from the embodiment of FIG. 1 in that the detection unit, indicated again with 31, is associated with a different guide roller 35 for the web material N formed by the tissue paper plies V1-V4. The guide roller 35 is arranged between the embossing-laminating unit 7 and the rewinding machine 23.

As mentioned above, the tissue paper thickness can be measured at several positions along the converting line 1. This is schematically represented in FIG. 2 by the presence of a second detection unit 37 and a third detection unit 39. In this embodiment, the second detection unit 37 is arranged upstream of the first embossing nip 9 formed between the first embossing roller 11 and the first pressure roller 13. The detection unit 37 measures the thickness of the tissue paper fed to the first embossing nip 9 before embossing.

In the illustrated embodiment, the tissue paper, whose thickness is measured by the detection unit 37, is formed by bonding two plies V2 and V4. In other embodiments, the paper, driven around a guide roller 38 associated with the detection unit 37, may be formed by a different number of plies, for example by the ply V2 only, by the ply V4 only, or by a number of plies greater than two.

The third detection unit 39 for detecting the tissue paper thickness is associated with a guide roller 40, around which, in this embodiment, the two tissue paper plies V1 and V3 are driven. In this case again, as for the tissue paper whose thickness is measured by the detection unit 37, the tissue paper fed around the guide roller 40 may be formed by a different number of plies.

In modified embodiments the converting line 1 of FIG. 2, only the detection unit 37, or only the detection unit 39, or only the detection unit 31 may be provided, or two detection units 37, 39 may be provided, the detection unit 31 being omitted.

Figure 3:
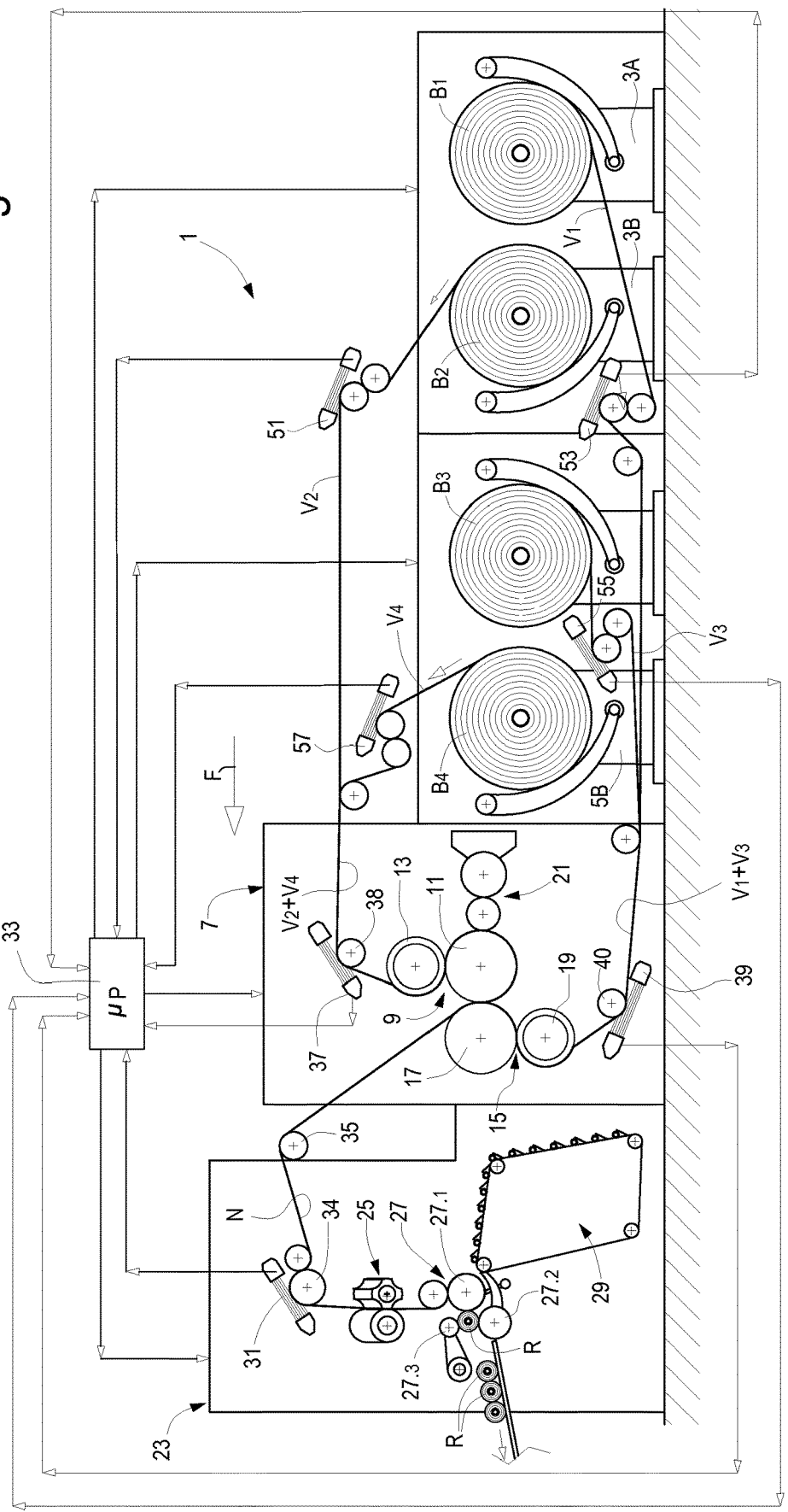

In other embodiments, the tissue paper thickness may be measured also, or only, at the exit of the unwinders 3, 5. FIG. 3 shows a third embodiment of the converting line 1, comprising parts or components corresponding to those of the converting lines of FIGS. 1 and 2, that will not be described again.

In the embodiment of FIG. 3, a detection unit 31 is provided just by way of example, associated with the rewinding machine 23 and the guide roller 34, in combination with detection units 37, 39 as described with reference to FIG. 2. In addition to the detection units 31, 37, 39, or instead thereof, detection units 51, 53, 55 and 57 may be provided, each of which is associated with one unwinding station 3A, 3B, 5A, 5B. Therefore, the detection units 51, 53, 55 and 57 measure the thickness of each individual ply V1-V4.

In the embodiment of FIG. 3, only the detection units 51-57 may be provided in combination with the detection unit 31, the detection units 37 and 39 being omitted. In other embodiments, only the detection units 51-57 may be provided at the exit of the unwinders 3, 5 in combination with the detection units 37, 39, the detection unit 31 being omitted.

The various detection units 31, 37, 39, 51-57 may have substantially the same configuration. Embodiments of detection units will be described below with reference to FIGS. 4 and 5. In these figures, the detection unit is indicated as a whole with number 31, but it should be understood that the detection units 37, 39, 51-57 may be substantially equal or equivalent to the detection unit 31.

Figure 4:
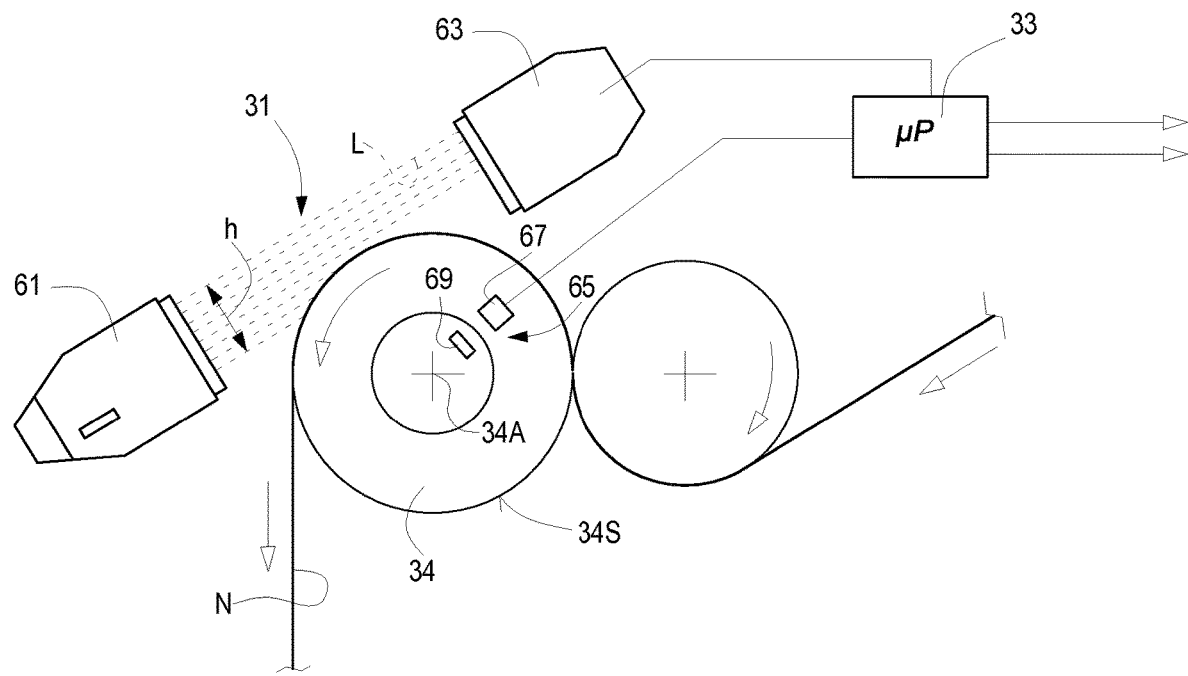
FIG. 4 shows an enlargement of an embodiment of a detection unit for detecting the tissue paper thickness.
Figure 5:
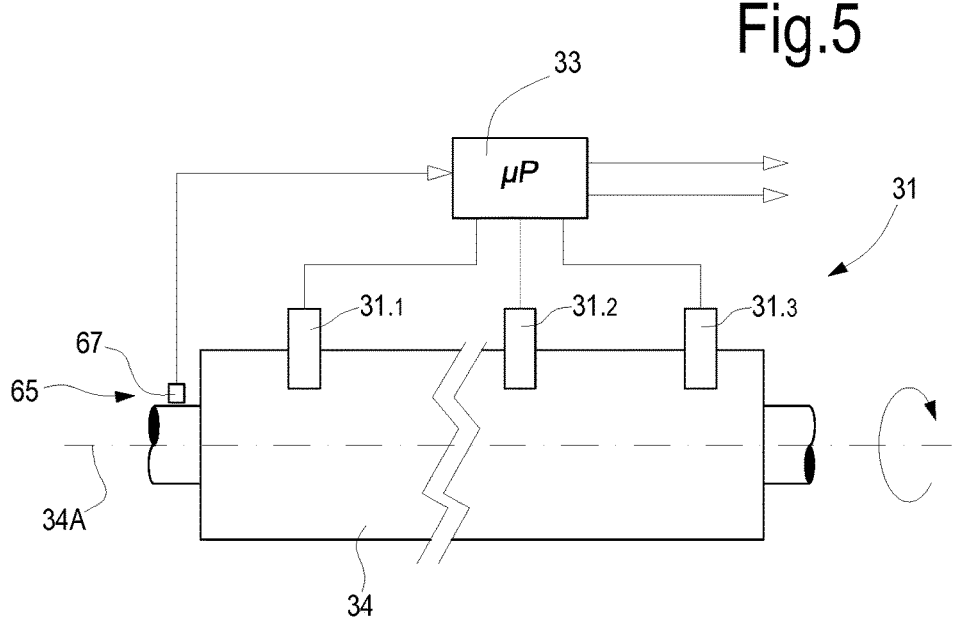
FIG. 5 shows a side view of a detection unit comprising a plurality of sensors aligned along the transverse direction of the tissue paper ply.

In the embodiment illustrated in FIG. 4, the detection unit 31 comprises at least one emitter 61 and one receiver 63. The emitter 61 and the receiver 63 may be specific for electromagnetic radiation, in particular for light radiation. Letter L schematically indicates an optical beam, i.e. a light radiation beam or, in general, an electromagnetic radiation beam. The beam may be laminar, i.e. it may be a very thin beam (of limited thickness in the direction orthogonal to the plane of FIG. 4), whose height H is in the order of some centimeters, for example from 2 to 15 cm. In advantageous embodiments, the detection unit 31 is directed with respect to the guide roller 34 so that the laminar optical beam L lies on a plane substantially orthogonal to the axis of the guide roller 34 with which the detection unit 31 is associated. The rotation axis of the guide roller 34 is indicated with 34A. More in general, the optical beam L intersects the axis of the guide roller 34, without being necessarily orthogonal thereto.

The laminar optical beam L may be generated by an array of LEDs in the emitter 61, while an array of light sensors, for example C-MOS sensors, may be provided in the receiver 63. The array of LEDs and the array of light sensors may be linear arrays or matrices. The LED optical radiation may be condensed in a cylindrical condenser to generate the laminar optical beam L.

The emitter 61 and the receiver 63 are arranged, with respect to the outer surface 34A of the guide roller 34, so that the laminar optical beam L is partially intercepted by the cylindrical surface 34S of the guide roller 34. In this way, the receiver 63 picks up an optical beam L whose dimension is substantially smaller than the dimension of the beam emitted by the emitter 61. The beam power received by the receiver 63 is therefore lower than the beam power emitted by the emitter 61. The closer to the rotation axis 34A of the guide roller 34 the optical beam L is, the greater the difference between emitted power and received power.

In case no tissue paper is driven around the guide roller 34, and keeping the detection unit 31 and the axis 34A of the guide roller 34 in fixed position, the amount of radiation received by the receiver 63 remains constant; therefore, the receiver 63 emits a constant signal received by the control system 33.

On the contrary, if a web material N, formed by one or more tissue paper plies V1-V4, is driven around the guide roller 34, the amount of radiation received by the receiver 63 will depend on the thickness of the web material N, i.e. on the tissue paper thickness. If the thickness remains constant, the signal emitted by the receiver 63 and received by the control system 33 is constant. Vice versa, if the thickness of the tissue paper forming the web material N varies over time, i.e. if the thickness is not constant along the longitudinal extension of the web material N, the signal emitted by the receiver 63 fluctuates, so that this signal is a function of the detected tissue paper thickness. The signal generated by the receiver 63 therefore changes according to the thickness of the tissue paper. In particular, if the laminar optical beam L is picked up by a plurality of light sensors forming a linear array, the paper thickness fluctuations may be detected based on the number of light sensors picking up the optical signal.

In this way it is possible to contactlessly detect the thickness of the tissue paper driven around the guide roller 34. In order to avoid that the signal, generated by the receiver 63 and indicating the thickness of the tissue paper forming the web material N, is altered due to any eccentricity of the cylindrical surface 34S, in some embodiments it is provided that the signal from the receiver 63 is detected only in a specific angular position of the guide roller 34.

To this end, an encoder or any other detection system, schematically labeled 65, may be provided for detecting the angular position of the guide roller 34. The angular position detection system 65 may comprise, for example, a magnetic or capacitive sensor 67 that generates an enabling signal when it detects the passage of a marking element 69 rotating integrally with the guide roller 34. Practically, the control system 33 reads the signal from the receiver 63 only in synchronism with a contemporaneous signal from the angular position detection system 65, combining for instance the two signals from the system 65 and the receiver 63 in a logic AND gate.

With an arrangement of this kind, the signal indicating the tissue paper thickness and generated by the receiver 63 of the detection unit 31 is not affected by an error resulting from a non-perfect cylindricity or eccentricity of the cylindrical surface 34S of the guide roller 34, on which the tissue paper is driven.

In some embodiments, the detection unit 31 (and, similarly, the detection units 37, 39, 51-57) may be arranged in a fixed position, for example in the center of the transverse extension of the web material N formed by the tissue paper plies V1-V4. In other embodiments, the detection unit 31 is movable; it can be, for instance, mounted on slides to translate with rectilinear reciprocating motion in a direction parallel, for example, to the rotation axis 34A of the guide roller 34. In this way, the thickness may be measured over time along the whole width of the tissue paper forming the web material N.

In other embodiments, in order both to simplify the mechanical structure of the detection unit 31 and to simultaneously measure the thickness at various points along the width of the web material N, more detection sensors are provided, forming as a whole the detection unit 31 and arranged along the transverse direction of the converting line 1, i.e. parallel to the axis 34A. This embodiment is particularly illustrated in FIG. 5, showing a view in a direction orthogonal to the axis 34A of the guide roller 34. In the illustrated embodiment, the detection unit 31 comprises more sensors, only three of which are shown in FIG. 5, indicated with 31.1, 31.2 and 31.3. For the sake of practicality of representation, the guide roller 34 has been interrupted, and in FIG. 5 only a portion thereof is shown. It should be understood that the number of sensors 31.*i* may be different than three, according to the axial dimension of the guide roller 34, that is in turn based on the maximal transverse dimension (width) of the web material N formed by the tissue paper processed in the converting line 1. In other embodiments, only two sensors are provided, each of which is arranged near a respective longitudinal edge of the web material N.

Each sensor 31.1, 31.2 and 31.3 may be made as schematically shown in FIG. 4 and therefore can comprise an emitter 61 and a receiver 63. Each emitter 61-receiver 63 pair of each sensor 31.1, 31.2, 31.3 generates a laminar optical beam L interfering with the cylindrical surface 34S of the guide roller 34. Therefore, each sensor 31.1, 31.2, 31.3 generates a signal indicating the thickness of the paper forming the web material N, substantially in the same way as described above with reference to FIG. 4, in the area where the sensor is arranged. Therefore, each sensor 31.1, 31.2, 31.3 gives the measurement of the thickness of the tissue paper forming the web material N in the respective transverse position along the axial extension of the guide roller 34, i.e. along the width of the web material N. In this way, the control system 33 receives a more complete piece of information on the tissue paper thickness along the whole width of the converting line 1, or, anyway, at two or more points along the width of the web material N.

In some embodiments, a plurality of sensors 31.1, 31.2, 31.3, . . . 31.*n* are mounted on a carriage or slide movable transversally to the web material feeding direction, so that the thickness is measured at more points of the web material N.

Even if it is preferred to align the various sensors 31.1, 31.2, 31.3 on a same transverse line, therefore associating them with only one guide roller, however it is also possible to arrange several sensors at several transversally and longitudinally offset points, associating them with two or more guide rollers arranged sequentially along the feeding path of the web material N.

The data obtained by the control system 33 through the measurement signals given by one or more detection units 31, 37, 39, 51-57, with which the converting line 1 is provided, are used for acting on the operating conditions of the converting line 1, by changing one or more operating parameters thereof, for example to modify the operating conditions according to a change in the tissue paper thickness detected by the detection unit.

For example, in some embodiments it is possible to measure the paper thickness and, if it is different from the nominal value, to act on one or more operating parameters of the converting line, in order to modify the thickness of the web material N, formed by the tissue paper wound in the rewinding machine 23, so as to bring the thickness again within a tolerance range around the nominal value.

For example, if the thickness measured downstream of the embossing-laminating unit 7 is greater or lower than the nominal value, or than a tolerance range around a nominal value, it is possible to act on the embossing-laminating unit 7, increasing or reducing the embossing pressure, i.e. the pressure with which either pressure roller, or both pressure rollers, 13, 19 act against the embossing rollers 11, 17. By increasing the embossing pressure, the embossing depth increases, and therefore the height of the embossing protuberances generated on the tissue paper plies, as well as, ultimately, the tissue paper thickness at the exit of the embossing-laminating unit 7 increases.

In other embodiments, other production parameters are modified to balance the effect of a web material thickness fluctuation.

In further embodiments, it is possible to act on the converting line 1 both to modify the paper thickness and to bring it again to the nominal value, and to modify other parameters, allowing balancing any residual discrepancies between the actual thickness and the nominal thickness.

For example, if the tissue paper thickness varies from a nominal value, it is possible to act on the winding conditions of the rewinding machine 23 to balance the thickness decrease/increase and to have a finished roll, whose outer diameter is within a tolerance range around a nominal value, notwithstanding the thickness variation. A reduction in the paper length wound on each roll may balance a thickness increase. Vice versa, a thickness decrease may be balanced by increase in the paper length wound on each roll, in order to have rolls or logs L, whose final diameter is within a tolerance range around a nominal value.

In other embodiments, it is possible to act on other factors affecting the winding density in order to balance paper thickness variations and to achieve the required final diameter. The winding density may be modified by acting on the web material tension and/or on the pressure exerted by the winding rollers and/or on the difference between the peripheral speeds of the winding rollers of the rewinding machine.

Mainly due to commercial reasons, the length of paper wound around each roll R cannot be lower than a minimum declared value nor greater than a maximum value; in the first case, the reason is to avoid to be charged with commercial fraud, in the second case to avoid to sell at a given price a paper amount greater than that for which that price was fixed. Therefore in some embodiments, instead of acting on the length of the wound web material, regarding it as a last resort, it is preferable to act on other parameters, adjusting them to balance the paper thickness variation or to achieve the thickness nominal value.

For example, it is possible to achieve the roll nominal diameter through a given set of production parameters, including: tissue paper thickness, winding density, and length of the paper wound on a roll. In some embodiments, the actual diameter of each roll, or of some rolls randomly, is measured and, in case of deviation from the preset nominal diameter, it is possible to adjust it by acting on one or more parameters. In case a paper thickness variation occurs together with a discrepancy between the measured diameter and the nominal diameter, it is possible to act on one or more production parameters.

However, measuring the rolls actual diameter is not mandatory. In fact, in other embodiments it is possible to estimate the diameter instead of measuring it. For example, a set of production parameters (winding density, paper thickness, wound length) may be preset, resulting in a given nominal diameter. When the paper thickness deviates from a nominal value, based on which other parameters have been already calculated to achieve the nominal diameter, it is possible to act on one or more of the production parameters to adjust the paper thickness bringing it again to the nominal value and/or to balance in a different manner the diameter variation resulting from the paper thickness deviation.

For example, slight thickness deviations may be balanced, in terms of end diameter of the roll R, by increasing or decreasing the amount of paper wound on each roll. If the paper thickness fluctuations are such that the roll outer diameter cannot be achieved without changing the wound length in an inadmissible manner, it is possible to act on the embossing pressure. In addition to, or instead of, acting on the embossing pressure, it is possible to act on other parameters, such as winding density, winding speed of the web material N on the roll R, ply unwinding speed from the reels, and paper tension.

For example, the winding density may be modified, in a known manner, by acting on the rotation speeds of the winding rollers of the rewinding machine 23 and/or on the pressure of the winding rollers against the roll being formed. Vice versa, the paper thickness fluctuations may be corrected by acting on a parameter other than the wound paper length, regarding this latter as the last resort if the change of other parameters is not sufficient to maintain the final diameter within the tolerance limits.

The thickness of the final multi-ply material N may be modified by acting on the thickness of one, some or all plies forming it. For example, in the case of a converting line comprising an embossing-laminating unit 7 with two embossing units, like the one illustrated in FIG. 2 (embossing units 11, 13 and 17, 19) the thickness fluctuations may be adjusted by acting on either one or both the embossing units. The choice of the embossing unit to act on depends on several factors, such as the number of plies embossed in the single embossing nip, the embossing pattern, the differences, if any, in the material of the plies, etc. By acting on the embossing unit it is possible to change the embossed ply thickness, increasing it by increasing the embossing pressure, or reducing it by decreasing the embossing pressure.

The control system 33 may interface several members of the converting line 1, in particular one or more of the following motors or actuators: motors for unwinding the parent reels B1-B4; motors of the winding rollers of the rewinding machine 23; adjustment members for regulating the tension of the ply (plies) V1-V4, N along the respective feeding path; actuators for controlling the position of the winding rollers of the rewinding machine 23, to modify the pressure exerted by the winding rollers 27.1, 27.2, 27.3 on the roll R being formed, in addition to the embossing-laminating unit 7.

The control system 33 may be suitably programmed to act on one or more of the above-mentioned parameters in order to have a finished product with the required features, notwithstanding paper thickness deviations in correspondence of one or more of the detection points described above and provided along the converting line 1.

Figure 6:
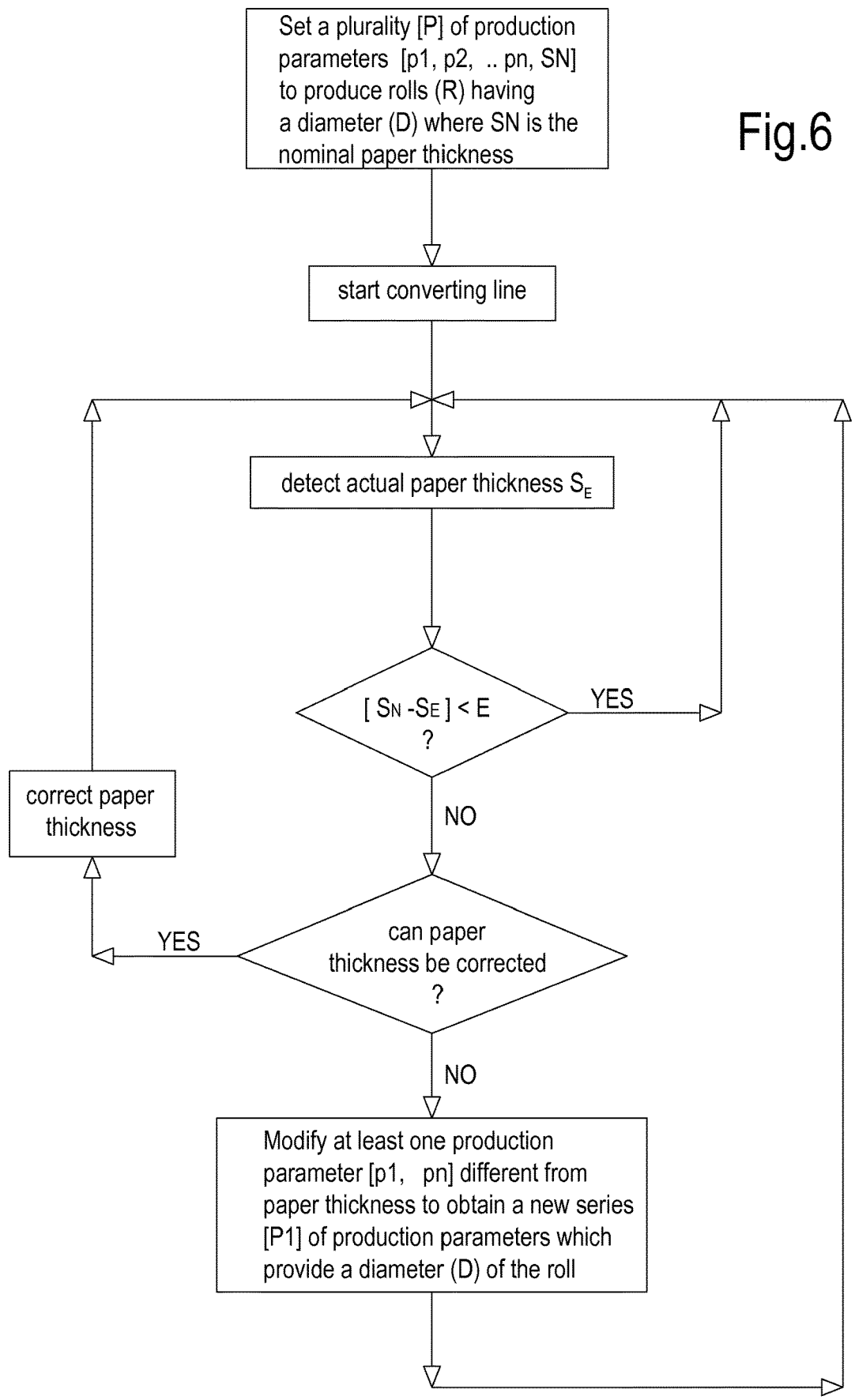
FIG. 6 shows a flow chart summarizing a method for controlling a converting line.

FIG. 6 shows a flow chart summarizing a method for controlling a converting line 1. In a first step, a series of production parameters is set to have rolls R with a given nominal diameter. The series of production parameters is generically indicated with $\{P\}=[p1, p2, \ldots pn, S_N]$ where $p1, p2, \ldots pn$ are generic production parameters and $S_N$ is the nominal thickness of the web material N (tissue paper) entering the rewinding machine 23. The parameters p1, p2, . . . pn may comprise: length of the web material wound on the roll, winding density, thickness of the single plies, etc. In some embodiments, the winding density may be, in turn, defined by a series of production parameters, such as web material tension, difference between the peripheral speeds of the winding rollers 27.1, 27.2, 27.3, etc. The parameters are set so as to achieve a nominal diameter (D) of the roll R.

Once the production parameters have been set, the production starts. During the production process, the thickness of the web material N is measured. The actual thickness $S_E$ is then compared with the nominal thickness $S_N$ and the difference, if any, is calculated. If the difference is lower than a threshold value E, the production continues without modifying the production parameters. If the difference between nominal value and actual value is greater than the threshold E, at least one of the parameters [p1, p2, . . . . Pn] is modified.

The method summarized in FIG. 6 provides first for verifying whether it is possible to act directly on paper thickness, in order to adjust it and reduce the difference E. This is usually possible and therefore the chosen parameter, for instance an embossing condition, is changed. The embossing condition may be for instance the pressure in an embossing nip of at least one of the embossing units formed by pairs of embossing roller and pressure roller. In this way, the thickness of at least one of the plies V1, V2, V3, V4 or groups of plies (for example in the case of FIG. 1 the groups of plies V1+V3 and V2+V3) is directly modified.

As mentioned above, it is possible to act on the embossing pressure either in one or in both embossing nips 9, 15 (FIG. 1).

However, situations may occur, where the paper thickness cannot be adjusted. For example, if the embossing pressure is already at the minimum value, it is not possible to further reduce the actual paper thickness $S_E$ to adjust the difference, as well as if the embossing pressure is already at the maximal value, it is not possible to increase the actual paper thickness $S_E$ to adjust the difference.

In this case, the control system 33 may be programmed to act on at least one different production parameter, which does not correct the paper thickness to reduce or eliminate the difference between $S_E$ and $S_N$. If the aim of the control is to keep the rolls actual diameter D within a tolerance interval around a nominal value, the control system 33 may be programmed to select a new series of production parameters {P1}, containing the thickness $S_E$ as nominal thickness and values for the remaining parameters such as to achieve the required nominal diameter. For example, the series of production parameters {P1} may contain a different value of winding density, or a different series of values of peripheral speeds of the winding rollers, having a different winding density.

For example, in case the measured thickness $S_E$ is lower than the nominal thickness originally set and it is no longer possible to increase the paper thickness as the maximum embossing pressure has been already achieved in all the embossing nips of the embossing-laminating unit 7, a lower winding density is set. This allows having the required diameter D of the rolls R even if the paper thickness is insufficient with respect to the nominal value $S_N$ originally set.

In some embodiments, the new series of production parameters may comprise the same nominal thickness or a different nominal thickness. The above-mentioned parameters may be used to modify the operating conditions of the converting line 1 when paper thickness fluctuations or variations are detected along the longitudinal extension of the tissue paper ply(plies) V1-V4 and of the multi-ply web material N. As described above, in some embodiments the tissue paper thickness, and therefore the thickness fluctuations in transverse direction may be detected. Indeed, conditions may occur wherein the thickness of the tissue paper plies varies not only in longitudinal direction but also in transverse direction. This can be due, for example, to the operating conditions of the embossing rollers, to the wear thereof, to the orientation thereof. Thickness variations may also occur in transverse direction of the tissue paper plies, due to the operating conditions of the continuous machine generating the parent reels B1-B4.

If the detection unit(s) comprise a system to detect thickness variations also in transverse direction, the control system 33 may be programmed to correct one or more operating parameters of the converting line 1 in order to balance tissue paper thickness variations in transverse direction. These transverse variations may be due, for example, to a non-uniform wearing of the pressure rollers of the embossing-laminating unit.

For example, when the converting line 1 comprises the embossing-laminating unit 7, the tissue paper thickness in transverse direction may be modified by changing the linear pressure profile between the pressure roller 13, or 19, and the corresponding embossing roller 11, or 17. By varying the linear pressure, i.e. the force per unit length, between an embossing roller and the respective pressure roller, in a different manner at the two opposite ends of the pair of rollers, the linear pressure profile is modified, and therefore also the paper thickness profile in transverse direction.

A further parameter on which to act in order to modify a tissue paper thickness alteration in transverse direction is the angle of reciprocal inclination between the axis of the pressure roller 13, or 19, and the axis of the corresponding embossing roller 11, or 17. Thickness variations in transverse direction may be balanced by suitably inclining these axes with respect to each another so that they do not lie perfectly on the same plane but are slightly skewed.

The use of several detection units arranged along the feeding or advancing path of the tissue paper web or ply according to some of the above disclosed embodiments can be useful to determine whether thickness fluctuations are generated in a particular section of the converting line and to select accordingly which production parameter shall be acted upon to correct the thickness variation. For instance, if a first detection unit is arranged upstream of an embossing-laminating unit 7 and a second detection unit is arranged downstream of said embossing-laminating unit 7, thickness fluctuations detected by both detecting units may be originated in the parent reel, while if only the second detecting unit detects a fluctuation in the paper thickness or caliper, while no thickness or caliper alterations are detected upstream of the embossing-laminating unit 7, this means that the thickness fluctuation is caused by malfunctioning of the embossing-laminating unit. The kind of correcting measure taken can be selected on the basis of where the thickness alteration or variation occurs.

It is understood that the drawing only shows an example provided by way of a practical arrangement of the invention, which can vary in forms and arrangement without however departing from the scope of the concept underlying the invention. Any reference numerals in the appended claims are provided to facilitate reading of the claims with reference to the description and to the drawing, and do not limit the scope of protection represented by the claims.

The invention claimed is:

1. A converting line for processing tissue paper, comprising:
   an unwinder for unwinding reels of tissue paper;
   a rewinding machine for forming rolls of tissue paper;
   a feeding path between the unwinder and the rewinding machine, for at least one ply of tissue paper;
   along the feeding path, at least one optical detection unit to detect thickness of the tissue paper fed along the feeding path in a feeding direction;
   a control system, interfacing with the at least one optical detection unit and adapted to act on at least one production parameter of the converting line according to detected tissue paper thickness;
wherein said at least one optical detection unit comprises at least one light emitter and at least one light receiver, arranged opposite each other, wherein said at least one light emitter is adapted to emit a light beam which intersects a cylindrical surface of a guide roller, around which the tissue paper is driven, and wherein said at least one light receiver is adapted to receive said light beam which is not intercepted by said cylindrical surface.

2. The converting line according to claim 1, further comprising, between the unwinder and the rewinding machine, an embossing unit comprising at least one embossing roller and at least one pressure roller, the at least one embossing roller and the at least one pressure roller defining an embossing nip, through which at least one ply of tissue paper passes.

3. The converting line according to claim 1, wherein said at least one production parameter is one or more of: tissue paper tension, tissue paper speed, an embossing condition in an embossing unit of the converting line, length of tissue paper wound on a roll being formed in the rewinding machine, speed of one or more winding members of the rewinding machine, and a pressure of one or more winding members of the rewinding machine on a roll being formed.

4. The converting line according to claim 1, wherein said at least one optical detection unit is combined with a tissue paper guide roller arranged along the feeding path and around which the tissue paper is driven; the at least one optical detection unit being configured and arranged to detect the thickness of the tissue paper in contact with the guide roller.

5. The converting line according to claim 4, wherein the control system is adapted to acquire information on the thickness of the tissue paper synchronously with an angular position of the guide roller.

6. The converting line according to claim 1, wherein the light beam is a laminar light beam.

7. The converting line according to claim 6, wherein the laminar light beam lies on a plane which is substantially orthogonal to the axis of the guide roller.

8. The converting line according to claim 1, wherein the at least one light emitter comprises a linear array of light emitters and the at least one light receiver comprises a linear array of light sensors, and wherein the at least one light emitter further comprises a cylindrical condenser.

9. The converting line according to claim 1, wherein said at least one optical detection unit is configured and arranged to move transversally to the tissue paper and to measure the thickness of the tissue paper along a direction transverse to the feeding path of the tissue paper.

10. The converting line according to claim 1, wherein the at least one optical detection unit comprises at least two sensors, staggered with respect to each other in a direction transverse to a forward direction of the tissue paper ply and spaced from each other in said transverse direction, so as to detect the thickness of the tissue paper in at least two transversally spaced points of the tissue paper ply.

11. The converting line according to claim 10, wherein the control system is adapted to act on at least one auxiliary production parameter of the converting line so as to correct an alteration of the thickness of the tissue paper in transverse direction.

12. The converting line according to claim 11, wherein said at least one auxiliary production parameter is one or more of a pressure profile between two rollers defining a nip through which the tissue paper passes, and a reciprocal inclination between axes of two rollers defining a nip through which the tissue paper passes.

13. The converting line according to claim 12, wherein said two rollers defining the nip through which the tissue paper passes are rollers of an embossing unit.

14. The converting line according to claim 1, further comprising two of said at least one optical detection unit, a first of said at least one optical detection unit and a second of said at least one optical detection unit being arranged in two points spaced from each other along the feeding path and each of the at least one optical detection units interface with the control system.

* * * * *